United States Patent [19]

Trombly et al.

[11] 3,786,473

[45] Jan. 15, 1974

[54] MULTIPLEXING CIRCUIT

[75] Inventors: John E. Trombly, Billerica; Warren G. Bender, Wellesley Hills, both of Mass.

[73] Assignee: Telecommunication Engineering Corporation, Burlington, Mass.

[22] Filed: Nov. 1, 1972

[21] Appl. No.: 302,895

[52] U.S. Cl. .................. 340/311, 179/1 H, 340/210, 340/310, 315/320, 315/361

[51] Int. Cl. .......................................... H04m 11/02

[58] Field of Search .................... 340/310, 311, 210, 340/286; 179/1 H; 315/320, 361 307/252 B; 38

[56] References Cited

UNITED STATES PATENTS 3,631,448 12/1971 Leslie .................................. 340/286

*Primary Examiner*—John W. Caldwell
*Assistant Examiner*—Robert J. Mooney
*Attorney*—Melvin R. Jenney et al.

[57] ABSTRACT

A circuit for transmission of power from a source over a line pair to a number of receivers connected to the line pair. Each receiver has a load device adapted for energization by the power source, and a circuit operable to change the impedance across the line pair from a first characteristic adapted for local power reception to a second characteristic adapted to cause remote actuation of a circuit in the source to connect power to the line pair.

19 Claims, 3 Drawing Figures

PATENTED JAN 15 1974 3,786,473

MULTIPLEXING CIRCUIT

BRIEF SUMMARY OF THE INVENTION

This invention relates generally to multiplexing circuits useful in communication systems. More particularly, it relates to a system for the controlled transmission of power from a source over a line pair to a number of receivers distributed along the line pair and connected to it in parallel. Each of the receivers has a load device operable upon the appearance of a sufficiently high potential across the transmission line pair. Each receiver also includes signal means operable upon circuits in the power source to cause this potential to appear across the line pair, thus causing operation of the load devices in all receivers.

It is common to provide signal circuits with plural stations, each station including a load device and signal means for connecting the power source across a transmission line pair for operation of the load devices such as buzzers, bells or lights. A principal object of this invention is to provide a system having similar functions, wherein the power for operating the load devices does not come from the receivers but from a power circuit that supplies the power for operating the load devices under the remote control of the signal means in the receivers. Thus each of the receivers comprises a passive network.

A second and related object is to provide a power circuit having alternate states of operation, one of which connects power to the transmission line pair, with means to switch from one state to the other under the remote control of signal means connected across the line pair in each of the receivers.

A third object is the multiplexing, upon a single line pair, of the signaling or control and power distribution functions described above.

Having in view the foregoing and other objects hereinafter appearing, this invention provides a multiplexed power control and transmission system operable over a line pair along which a plurality of receivers are distributed, and including a power circuit connected to a source of power and having a power gate remotely controllable over the line pair to connect the source to the line pair. The power gate is associated with control means adapted to operate the gate in response to operation of a signal means in any one of the receivers.

Another feature of the invention resides in the particular circuits employed for operation of the control means in the power circuit as a function of the impedance appearing across the line pair, this impedance being altered by selective operation of the signal means in the receivers.

Other features of the invention reside in certain circuits, controls and relationships of the elements that will be evident from the following description of a preferred embodiment illustrated in the drawing.

DETAILED DESCRIPTION

Figures 1, 2, 3:
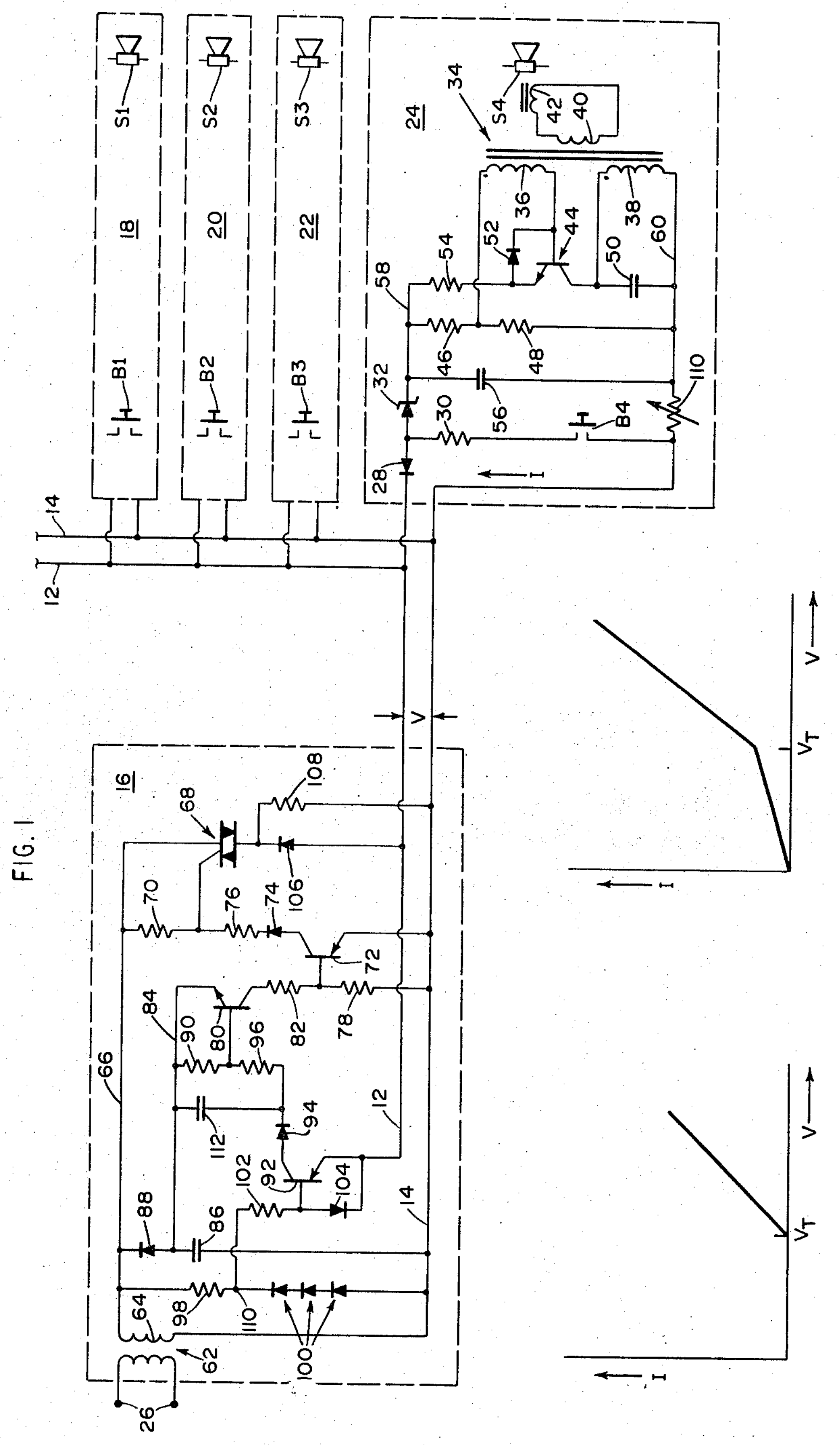
FIG. 1 is a schematic circuit diagram illustrating the preferred embodiment.
FIG. 2 is a diagram of the impedance characteristic across the line pair with the signal means in one state of operation.
FIG. 3 is a diagram similar to FIG. 2 with the signal means in a second state of operation.

The illustrated embodiment of the invention is adapted for use in a telephone network comprising a central service unit with terminals for a number of external transmission line pairs extending to a central office or other transmission or switching facility. A number of stations are connected to the central service unit. In this application the stations preferably comprise key telephones each having a momentary-type signal key that may be depressed to buzz all or some preselected number of the other stations. Buzzer systems of this kind provide manual intercommunication between the stations as distinguished from dial intercommunication, for which purpose suitable conventional intercommunication circuits are also provided at the individual stations and within the central service unit. Since the circuits for ringing from the external lines, for connection of incoming calls, for dialing and for intercommunication form no part of this invention and may comprise conventional means, they are not shown and described herein.

Moreover, it will be evident from the following description that the circuits of this invention will find application in other kinds of systems for transmitting power from a source to a number of receivers distributed along a trasmission line pair.

Referring to the illustrated system by way of example, lines 12 and 14 comprise a transmission line pair extending from a power circuit 16 to each of a number of receivers 18, 20, 22, and 24 distributed along the line pair 12, 14. Each receiver is located at a corresponding station and is preferably embodied in an adapter for a conventional multi-key telephone set (not shown). For purposes of this description the circuit in each of the receivers is identical to that shown for the receiver 24 and includes a normally open, momentary signaling pushbutton B1, B2, B3 or B4 and a signal buzzer S1, S2, S3 or S4. It will be noted that the circuits are entirely passive; that is, they are adapted only to receive energy from the transmission line pair 12, 14 and have no locally available sources of power for operating the buzzers.

The power circuit 16 is conveniently housed within the central service unit of the telephone network, and has terminals 26 for connection to a source of alternating current. The line pair 12, 14 preferably comprises one of a number of line pairs connecting the individual stations to the central service unit. The power circuit 16 provides power for operating the signal buzzers S1 to S4 in response to the depression of any one of the signal buzzers B1 to B4. The circuit 16 has two primary modes of operation, namely, a first mode corresponding to the condition when none of the pushbuttons B1 to B4 is depressed and the voltage across the line pair 12, 14 is not sufficient to energize the buzzers, and a second mode in which one of the pushbuttons is depressed and a voltage sufficient to energize the buzzers is applied across the line pair.

Referring next to the receiver circuit 24, this circuit is connected to the transmission line pair 12, 14 through a diode 28 that renders the circuit conductive only when the line 14 is positive with respect to the line 12. A resistance 30 is connected through the pushbutton B4 in series with the diode 28 across the line pair.

Other elements of the circuit 24 are connected through a zener diode 32 and comprise a conventional transformer-coupled blocking oscillator. A transformer 34 includes primary windings 36 and 38, and a secondary winding 40 connected for energizing the coil 42 of the buzzer S4. The primary winding 36 is connected to the base of a transistor 44 and to the common connection of resistors 46 and 48. The primary winding 38 is connected across a condenser 50. A diode 52 is connected between the emitter and the base of the transistor. A resistor 54 is connected between the emitter and one terminal of the resistor 46. A condenser 56 is connected across the voltage divider network comprising the resistors 46 and 48.

The zener diode 32 permits a voltage to be applied between leads 58 and 60 for inducing oscillations and a buzzer sound only when the line 14 is sufficiently positive with respect to the line 12 to cause the potential across the zener diode to exceed its breakdown value.

FIG. 2 illustrates the impedance characteristic across the line pair 12, 14 with all pushbuttons B1 to B4 open, as represented by a plot of the instantaneous current I flowing between the line pair through the receivers, for values of the instantaneous potential of the line 14 with respect to the line 12 ranging from zero to a positive value. The threshold voltage $V_T$ corresponds substantially to the breakdown potential of the zener diode 32. Above this threshold the impedance is substantially linear and the receiver circuits are oscillating.

FIG. 3 shows the impedance characteristic across the line pair for the condition in which the signal pushbutton B4 is depressed. At instantaneous voltage levels below the value $V_T$ the impedance characteristic is linear and corresponds to that of the resistor 30. Above the threshold voltage $V_T$ the impedance characteristic is also linear but with a greater slope corresponding to the parallel connection of the resistor 30 with the oscillator circuit.

The operating characteristics of the power circuit 16 are described below in detail. They may be summarized with reference to a single cycle of an alternating current source connected to the terminals 26, and are the same for every cycle. The terminals 26 are connected to the primary winding of a transformer 62. A secondary winding 64 on the transformer is connected to the line 14 and to a lead 66. During the half-cycle in which the line 14 is negative with respect to the lead 66 no significant potential appears between the lines 12 and 14. During the half-cycle in which the line 14 is positive with respect to the lead 66, referred to below as "the negative half-cycle," and operating potential appears between the lines 12 and 14 which is sufficient to energize the buzzers in the receivers if a pushbutton such as B4 is depressed, but a potential insufficient to operate the buzzers appears across the lines if no pushbutton is depressed. The potential for operating the buzzers is switched across the lines by a power gate comprising a triac 68 which, when conducting, applies substantially the full potential across the secondary winding 64 to the lines 12 and 14. The oscillation of the buzzer circuits is sustained only while the power gate 68 continues to be operated. This, in turn, continues only as long as a pushbutton such as B4 is held depressed.

Considering the circuit 16 in greater detail, conduction in the power gate triac 68 can be initiated only by a flow of current through a resistor 70 connected to its gate. This can occur only during conduction of a transistor 72, and a diode 74 limits such conduction to negative half-cycles as defined above. A circuit comprising the emitter and collector of this transistor, the diode 74, a resistor 76 and the resistor 70, is connected across the secondary winding 64 of the power transformer. However, the transistor 72 is non-conductive unless current is flowing through a resistor 78 to establish a bias between the base and the emitter. This in turn occurs only during conduction of a transistor 80. A circuit comprising the resistor 78, a resistor 82 and the emitter and collector of this transistor is connected between the line 14 and a lead 84. The lead 84 has a *d.c.* potential which is negative with respect to the line 14, being established by a condenser 86 and a diode 88 connected in series across the secondary winding 64. However, the transistor 80 is non-conductive unless current is flowing through a resistor 90 to establish a bias between the base and the emitter. This in turn occurs only as a result of conduction in a transistor 92 which may be termed a control gate. Conduction occurs in this transistor only during a negative half-cycle, the circuit extending from the secondary winding 64, through the line 14, impedances in the receivers connecting the lines 14 and 12, the emitter and collector of the transistor 92, a diode 94, a resistor 96, the resistor 90, and the diode 88 back to the winding 64. Conduction in the transistor 92 is also supported by the charge on the condenser 86. However, the transistor 92 is non-conductive unless its base is sufficiently negative with respect to its emitter to establish the necessary bias. The circuit by which this bias is established includes a resistor 98, a series of diodes 100 connected in series with the resistor 98 across the winding 64, a resistor 102 and a diode 104 having a common connection at the base, and the impedance appearing between the lines 12 and 14.

During positive half-cycles, current may flow from the winding 64, through the resistors 98 and 102, the diode 104, the line 12, a diode 106, a resistor 108 and the line 14 back to the winding 64. However, the potential drop across the diode 104 imposes a reverse bias on the transistor 92 and it is prevented from conducting.

During a negative half-cycle, if none of the pushbuttons B1 to B4 is depressed, negligible current flows between the emitter and the collector of the transistor 92. The diodes 100 collectively support only a small maximum voltage drop, for example 1.8 volts with a voltage of 28 volts r.m.s. across the winding 64. Therefore, during most of this half-cycle the potential at the connection 110 of the diode chain 100 with the resistors 98 and 102 remains about 1.8 volts negative with respect to the line 14. With no pushbutton depressed, current may flow from the winding 64, through the line 14, the high impedances in each receiver such as a variable resistance 110, resistors 48 and 46 and the reverse biased zener diode 32, the diode 28, the line 12, the emitter and base of the transistor 92, and the resistors 102 and 98 back to the winding 64. However, with the potential of the connection 110 clamped as described above and with an impedance between the lines 12 and 14 that is much greater than that of the resistance 102, the potential at the emitter will remain about 1.8 volts negative with respect to the line 14 during this half-cycle, and therefore there will be no forward bias present from the base to emitter of the transistor. The maximum instantaneous voltage across the secondary 64 substantially exceeds the value $V_T$. For that portion of the negative half-cycle during which the voltage is less than the value $V_T$ (FIG. 2), the zener diode such as 32 in each of the receivers prevent conduction to the emitter of the transistor 92. After the instantaneous value of the voltage across the winding 64 exceeds the value $V_T$, the transistor 92 remains non-conducting as long as the impedance characteristic of FIG. 2 applies between the transmission line pair 12, 14.

During a negative half-cycle, if the pushbutton B4 is depressed the resistance 30 is connected between the lines 12 and 14. This resistance may be, for example, about one-fourth as great as the resistance 102. The substantial reduction in impedance permits an appreciable current to flow from the emitter to the base, thereby gating current from the emitter to the collector circuit. All of the transistors 92, 80 and 72 and the triac 68 become conducting and the triac 62 remains conducting until the termination of this half-cycle, the circuit being so constructed as to be self-extinguishing at the conclusion of this half-cycle. Current flow in the resistors 90 and 96 is accompanied by the charging of a condenser 112. This condenser sustains the conduction of the transistor 80 after the transistor 92 ceases to conduct. While the triac 68 is conducting, the potential across the winding 64 appears between the lines 12 and 14.

This reverse-biases the emitter-to-base junction of the transistor 92, switching it to a non-conducting state. This initiates the discharge of the condenser 112 through the resistors 96 and 90, and eventually the current in this discharge circuit diminishes to the point where the forward bias between the base and emitter of the transistors 80 is insufficient to sustain conduction in this transistor. The switching of the transistor 80 to a non-conducting state also switches the transistor 72 to a non-conducting state. Current therefore ceases to flow through the gate of the triac 68, but the triac remains conducting until the end of the negative half-cycle.

As previously stated, the circuit 16 restores itself to a non-conducting state at the end of each negative half-cycle, whether or not one of the pushbuttons B1 to B4 remains depressed. The entire cycle is therefore repeated during the next negative half-cycle provided that one of the pushbuttons still remains depressed.

It will be apparent that while specific load devices in the form of conventional blocking oscillators have been shown for purposes of illustration, other forms of load devices operable under the described conditions may be substituted. Other modifications, adaptations and arrangements of the parts of the receivers and of the power circuit 16 may also be employed without departing from the spirit or scope of the invention.

I claim:

1. A power transmitting system including, in combination, a transmission line pair, a plurality of receivers each comprising first and second circuits, the first circuit having a first impedance and signal means operable to connect the first impedance across the line pair, the second circuit having a load device and comprising a second impedance connected across the line pair, and a power circuit comprising a source for a voltage, a power gate operable to connect the source to the line pair, and control means adapted to operate the power gate in response to operation of a signal means.

2. A power transmitting system according to claim 1, in which the control means include an operating circuit connected to the line pair and means operable thereby to operate the power gate in response to operation of a signal means.

3. A power transmitting system according to claim 2, in which the voltage has periodic zero transitions.

4. A power transmitting system according to claim 2, in which the control means are adpated to energize the line pair synchronously with said voltage.

5. A power transmitting system according to claim 2, in which the control means include a sensing gate having an operating circuit connected to the line pair, the sensing gate being operable by the operating circuit to operate the power gate in response to operation of a signal means.

6. A power transmitting system according to claim 2, in which the first impedance is smaller than the second impedance, the operating circuit being adapted to cause operation of the power gate when the first impedance is connected across the line pair.

7. A power transmitting system according to claim 6, in which the voltage has periodic zero transitions.

8. A power transmitting system according to claim 5, in which the first impedance is smaller than the second impedance below a threshold level, the operating circuit being adapted to operate the sensing gate when the first impedance is connected across the line pair.

9. A power transmitting system according to claim 8, in which the voltage has periodic zero transitions.

10. A power transmitting system according to claim 2, in which the operating circuit is polarity discriminating. conductivity

11. A power transmitting system according to claim 1, in which the first impedance has substantially greater conductivity below a predetermined threshold voltage level than the second impedance.

12. A power transmitting system according to claim 5, in which the first impedance has substantially greater conductivity below a predetermined threshold voltage level than the second impedance and the sensing gate is operable by a flow of current through the first impedance during application of a voltage less than said threshold level across the line pair to cause the power gate to connect a voltage greater than said threshold level across the line pair.

13. A power transmitting system according to claim 12, in which the load device is operable only upon appearance of a voltage above said threshold level across the line pair.

14. A power transmitting system according to claim 2, in which the power circuit includes parallel-connected branch circuits connected to the source, one said branch circuit including the power gate and the line pair in series connection and the other said branch circuit including the operating circuit and the line pair in series connection.

15. A power transmitting system according to claim 14, in which the voltage has periodic zero transitions.

16. A power transmitting system according to claim 1, in which the control means comprise an impedance variable as a function of the magnitude of the impedance connected across the line pair.

17. A power transmitting system according to claim 5, in which the sensing gate is an impedance variable as a function of the magnitude of current flowing in the operating circuit.

18. A power transmitting system according to claim 1, in which the load devices in the receivers are energized exclusively by the power circuit.

19. A power transmitting system according to claim 1, in which the first and second impedances have mutually spaced current zero-crossings in their voltage-current characteristics.

* * * * *